United States Patent [19]
Stephens

[11] Patent Number: 5,838,397
[45] Date of Patent: Nov. 17, 1998

[54] OPTICAL FLUID FOR PROJECTOR PRISM

[75] Inventor: Craig Stephens, Carlsbad, Calif.

[73] Assignee: Hughes-JVC Technology Corporation, Carlsbad, Calif.

[21] Appl. No.: 542,396

[22] Filed: Oct. 12, 1995

[51] Int. Cl.[6] .................................................. G07F 1/1335
[52] U.S. Cl. ................................................ 349/5; 359/629
[58] Field of Search ...................... 359/629, 630, 359/631; 349/7, 8, 9

[56] References Cited

U.S. PATENT DOCUMENTS

| | | |
|---|---|---|
| 2,403,731 | 7/1946 | MacNeille . |
| 4,343,535 | 8/1982 | Bleha, Jr. . |
| 4,650,286 | 3/1987 | Koda et al. . |
| 4,764,806 | 8/1988 | Altman ...................................... 358/60 |
| 5,373,394 | 12/1994 | Oh ........................................... 359/634 |

*Primary Examiner*—William L. Sikes
*Assistant Examiner*—James A. Duclek
*Attorney, Agent, or Firm*—Harness, Dickey & Pierce, P.L.C.

[57] ABSTRACT

An optical system including a transparent fluid and a container filled with the fluid as well as at least one optical element having an index of refraction which approximately matches that of the fluid. The fluid is chosen to have a viscosity no greater than 40 centistokes. As a result, the low viscosity of this optical fluid reduces thermal irregularities. Also, improved transmission, particularly in the blue spectrum is achieved as compared to conventional optical fluids.

25 Claims, 3 Drawing Sheets

SPECTRAL OUTPUT W/CARGILLE CODE 1160 AFTER UV

| CARGILLE CODE 1160 AFTER UV | | | | | |
|---|---|---|---|---|---|
| WHITE | X= | 0.342 | | EFF.ON= | 0.149164 |
| | Y= | 0.389 | | EFF.OFF= | 0.001575 |
| | | | | | |
| | U¹= | 0.196 | | | |
| | V¹= | 0.501 | | | REL.% |
| | | | | | |
| RED | U¹= | 0.439 | | EFF.ON= | 3.79% | 25.43% |
| | V¹= | 0.534 | | | |
| | | | | | |
| GREEN | U¹= | 0.111 | | EFF.ON= | 10.33% | 69.28% |
| | V¹= | 0.578 | | | |
| | | | | | |
| BLUE | U¹= | 0.152 | | EFF.ON= | 0.79% | 5.29% |
| | V¹= | 0.167 | | | |
| | | | | TOTAL= | 14.92% | 100% |

SPECTRAL OUTPUT W/DMP AFTER UV

WAVELENGTH (nm)

| DMP AFTER UV | | | | | | |
|---|---|---|---|---|---|---|
| WHITE | X= | 0.321 | | EFF.ON= | 0.210694 | |
| | Y= | 0.353 | | EFF.OFF= | 0.002225 | |
| | | | | | | |
| | U$^1$= | 0.195 | | | | |
| | V$^1$= | 0.482 | | | | REL.% |
| | | | | | | |
| RED | U$^1$= | 0.438 | | EFF.ON= | 5.26% | 24.99% |
| | V$^1$= | 0.534 | | | | |
| | | | | | | |
| GREEN | U$^1$= | 0.111 | | EFF.ON= | 14.53% | 68.97% |
| | V$^1$= | 0.576 | | | | |
| | | | | | | |
| BLUE | U$^1$= | 0.164 | | EFF.ON= | 1.27% | 6.04% |
| | V$^1$= | 0.147 | | | | |
| | | | | | TOTAL= | 21.07% | 100% |

OPTICAL FLUID FOR PROJECTOR PRISM

BACKGROUND OF THE INVENTION

1. Technical Field

The present invention relates to optical systems and more particularly to an optical system employing an optical fluid having improved performance.

2. Discussion

Optical fluids have a number of important applications in optical systems. In general, optical fluids are used to avoid abrupt shifts in index of refraction, encountered by a light beam, for example, when a light beam passes through an air/glass interface. The optical fluid, if its index matches that of the glass, minimizes this index refraction change which would degrade optical performance.

One important application for optical fluids is a type of beamsplitter which is widely use for selectively passing and reflecting a light beam. Such beamsplitters include a thin, flat, parallel sided, transparent plate mounted in a transparent liquid or solid medium at an angle (commonly about 45 degrees), to the axis of the beam of light that is to be transmitted or reflected. Such beamsplitters may be polarizing or non polarizing.

A polarizing beamsplitter, but not of the embedded (immersed in optical fluid) type, is described in U.S. Pat. No. 2,403,731 issued to MacNeille. The polarizing beamsplitter, such as the MacNeille type polarizing beamsplitter will pass light having one polarizing state, such as the "P" state, for example, and reflect light with another polarization state, such as the "S" state. Thus, the polarizing beamsplitter selectively passes or transmits a light beam, depending upon whether the polarization vector of the light is one or the other of two mutually orthogonal directions. In the beamsplitter described in the MacNeille patent, a plurality of dielectric layers of appropriate indices of refraction and thicknesses are deposited at the interface between the two halves of a glass cube wherein the mating surface extends diagonally between two diagonally opposite edges of the cube.

In an embedded MacNeille polarizing beamsplitter, a housing of generally cubic configuration is provided with transparent front, back, entrance and exit windows. This housing is filled with a fluid in which is suspended a prism plate comprising a thin plate with mutually parallel planar sides that extend diagonally across the cube. A plurality of thin dielectric layers, of the type described in the MacNeille patent, may be applied to the thin plate to make this embedded prism a MacNeille polarizing prism. Such embedded prisms exhibit a color defect known as "lateral chromatic aberration", which significantly decrease clarity and resolution of transmitted light and also significantly reduces contrast, thereby producing an image of decreased quality. This aberration is due to the different variation of index refraction with color from one material to another.

To avoid bending of the light transmitted through the embedded prism plate, the prism and the fluid in which it is immersed are made of materials selected to have matching indices of refraction. As is well known, the index of refraction of a material is proportional to the reciprocal of the velocity of light propagated in the material, and such velocity varies from one material to another. Thus, as the light passes from one material to another with a different index of refraction, the light beam is bent. Accordingly, an embedded prism must be constructed with materials having the same index of refraction insofar as possible, if beam bending is to be minimized.

The embedded prism polarizing beamsplitter, e.g. an embedded MacNeille-type polarizing beamsplitter, useful in a wide variety of applications. One example of such an application is a color projection system employing a liquid crystal light valve. Examples of such projection systems are described in U.S. Pat. No. 4,343,535 to Bleha, and in U.S. Pat. No. 4,650,286 to Koda. For example, some systems of this type may use a prism plate of Schott BK-7 glass having an index of refraction of 1.518298 at 554.5 nanometers in conjunction with a Cargille Code 1160 fluid having an index of refraction of 1.515 at the same wavelength at a temperature of 25 degrees Celsius.

In such a color projection system, as described in detail in these patents, light from a light source is reflected from a MacNeille prism to a liquid crystal light valve which causes the light valve to retroreflect light of a particular polarization in accordance with modulation imposed on the light valve by an image generator, such as a cathode ray tube. The uniquely polarized light modulated and retroreflected from the light valve is then transmitted through the embedded MacNeille prism and projected via a projection lens. The optical fluid minimizes bending of light at the fluid-glass interfaces as compared to an glass-interface. However, optical fluids do have some drawbacks.

In general, there are a number of desired characteristics for optical fluids when used in systems such as the above-described liquid crystal light valve color projection systems. For example, it is desirable that the optical fluid does not have toxic properties, has low vapor pressure, no disagreeable odor, have a high flash point, and a freezing point which is below the operating temperature. Also it is desirable for the fluid to be soluble in commercial solvents for clean up and be compatible with other optical materials. Conventional optical fluids, such as the Cargille Code 1160, generally meet these requirements.

However, there are additional desirable features which are not entirely met by conventional optical fluids. For example, because Cargille Code 1160 is a chemical mixture which results in some undesirable features. For example, it appears to contain a certain amount of contaminants and its difficult to test for purity. Also, it does not appear to be consistent from batch to batch. As a result its properties (such as transmission) vary from batch to batch apparently due to variations in manufacturing processes. Furthermore, this fluid is relatively expensive and exhibits poor recovery from freezing. Moreover, because it has a relatively high viscosity, this fluid exhibits thermal instability, which results in refraction variations (heat waves). This results in fluctuations in the resulting image that limit resolution and cause oscillations irregularly across the image. For example, Cargille Code 1160 has a viscosity of 53 centistokes at 17 degrees Celsius as measured with a Zahn cup-type viscosimeter. Also, there appears to be some problems with the accumulation of particles on the glass plates in the MacNeille prisms.

Further, the Cargille Code 1160 optical fluid has relatively poor transmission throughout the appropriate visible optical spectrum. This is particularly noticeable in applications where the total optical pathlength in the fluid is long. In addition, this optical fluid exhibits low transmission in the blue region. As a result, in three color systems, red and green channels must be turned down to achieve a relatively higher levels of blue transmission. This lowers the overall brightness of the system.

Thus, it would be desirable to provide an improved optical system which utilizes a superior optical fluid that has improved transmission. It would be particularly desirable for the fluid to have improved transmission in the blue spectrum to improve the color temperature, and thus avoid the necessity of lowering the red and green channels. It would also be desirable to provide a system utilizing an optical fluid which has low viscosity to minimize thermal irregularities. Furthermore, it would be desirable to provide such an optical fluid which is low in cost, which recovers well from freezing and which minimizes the formation of particles on internal glass plates. Also, it would be desirable to provide such a system utilizing a fluid which is pure and free of contaminants and which has consistently reproducible optical properties from batch to batch.

SUMMARY OF THE INVENTION

In carrying out the principles of the present invention in accordance with a preferred embodiment thereof there is provided an optical system including a transparent fluid and a container filled with the fluid having at least one window for permitting subject light to enter therein. At least one optical element within the container performs a predetermined optical function on the subject light. The fluid is chosen to have a viscosity no greater than 40 centistokes and to have an index of refraction approximately matching that of the optical element. As a result, the present invention results in an optical system which reduces the thermal irregularities due to the low viscosity of the fluid. Also, the system has improved transmission, particularly in the blue spectrum. In addition, in the preferred embodiment dimethyl phthalate is used which is relatively low in cost and has good recovery from freezing and is highly pure and has reproducible optical qualities.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
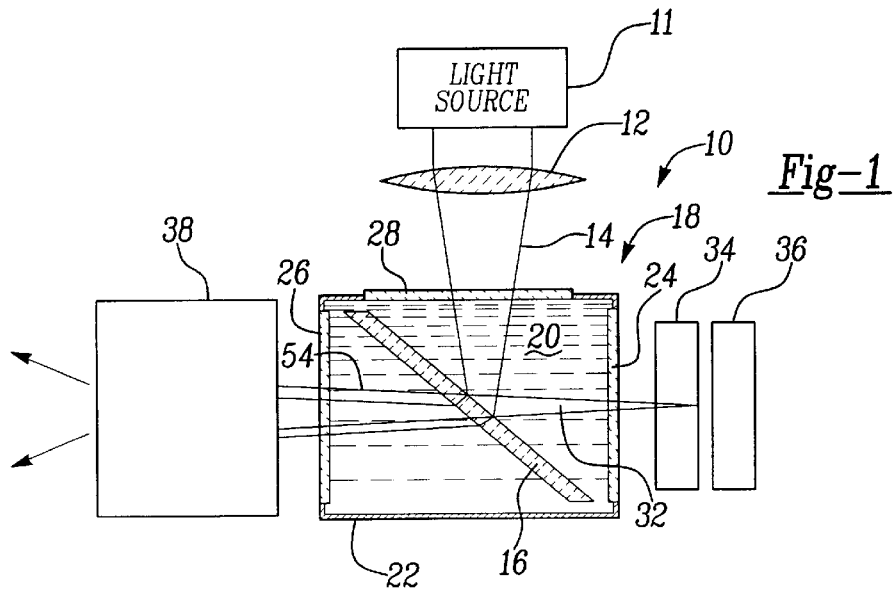
FIG. 1 is a diagram of a liquid crystal light valve projection system utilizing a MacNeille prism immersed in an improved optical fluid in accordance with a preferred embodiment of the present invention.

Referring to FIG. 1, there is shown a liquid crystal light valve color projection system of the type generally shown in U.S. Pat. Nos. 4,343,535 and 4,650,286 discussed above. In brief, this color projection system 10 includes a light source 11 that emits unpolarized light that is transmitted through a collimating lens 12 which directs the light beam 14 to a prism plate 16 of an embedded version 18 of a MacNeille prism. The MacNeille prism is a polarizing beamsplitter which accomplishes selective polarization, as generally described in the MacNeille U.S. Pat. No. 2,403,731. The embedded MacNeille-type prism 18 schematically depicted in FIG. 1 comprises a parallel, flat sided, transparent prism plate 16 coated with a plurality of thin dielectric layers (as described in the MacNeille patent), and suspended in an optical fluid 20, all carried in a fluid-tight housing generally indicated at 22, having a transparent front window 24 and a transparent exit window 26.

The polarizing beamsplitter 18 also includes an input window 28 through which it receives randomly polarized light from source 11. Unpolarized light beam 14, which reaches transparent prism 16 has light of "S" polarization reflected and light of "P" polarization state transmitted.

Reflected light of "S" polarization state travels along a reflected beam 32 to a liquid crystal light valve 34 that is modulated by an image generating source such as a cathode ray tube 36. Where the screen of the cathode ray tube 36 has no phosphor emission and is therefore dark, the corresponding area of the light valve 34 remains in an off state, and light is retroreflected from the light valve 34 back to the polarizing prism with its polarization state unchanged. Because the polarization of the light is unchanged from its original "S" state light is then reflected from the beamsplitter prism plate 16 and returns to the light source 11. None of this light of the polarization state "S" is transmitted by the prism plate from the light valve 34 to the projection lens and thus the corresponding areas imaged by a projection lens 38 remain dark.

For the phosphor areas of the screen of cathode ray tube 36 that are bright, some or all of the light reflected from the light valve 34 is rotated from "S" polarization state to "P" polarization state, and acquires an intensity proportional to the intensity of the light from the cathode ray tube screen. This light of polarization state "P" is retroreflected by the light valve 34 and transmitted through the prism plate 16, passing through the beamsplitter exit window 26 and projection lens 38 to form a bright image on a projection screen (not shown).

As discussed above, the optical fluid 20 is utilized to reduce the shift in index of refraction encountered by the light beam 14 as it passes from the window 28 to optical fluid 20 and also through the interfaces between optical fluid 20, plate 16 and window 24. For example, in prior art systems of this type where the prism plate and windows are made of BK-7 glass having an index of refraction of 1.518298 at 554.5 nanometers, the optical fluid often employed for fluid 20 is Cargille Code 1160 fluid having an index of refraction of 1.515 at the same wavelength at 25 degrees Celsius. The viscosity of the Cargille code 1160 fluid is approximately 53 centistoke at 17 degrees Celsius. As discussed above, however, there are a number of drawbacks with this optical fluid including the thermal instability problem due to high viscosity, poor transmission, poor recovery from freezing, high cost, and lack of purity and reproducability.

Thus, in accordance with the present invention, optical fluid 20 is composed of a single component, low-viscosity fluid which also has an index of refraction which matches, or nearly matches, BK-7 glass. In preferred embodiments of the present invention fluid 20 is composed of a transmissive, homogeneous fluid having a low molecular weight hydrocarbon, fluorocarbon, or chlorofluorocarbon as a major component. For example, the fluid may be of the esther phthalate family such as dimethyl phthalate (DMP) or diethyl phthalate (DEP), with DMP being preferred. By "low viscosity" it is meant that the fluid has a viscosity no greater than 40 centistokes at 17 degrees Celsius as measured with a Zahn cup-type viscosimeter. One such viscosimeter is manufactured by Boekel, Inc. of Philadelphia, Pa. For example, DMP has a viscosity of only 32 centistokes at 17 degrees Celsius and a viscosity of about 10 centistokes at 25 degrees Celsius, and DEP has a viscosity of about 9 centistokes at 25 degrees Celsius.

Figure 2:
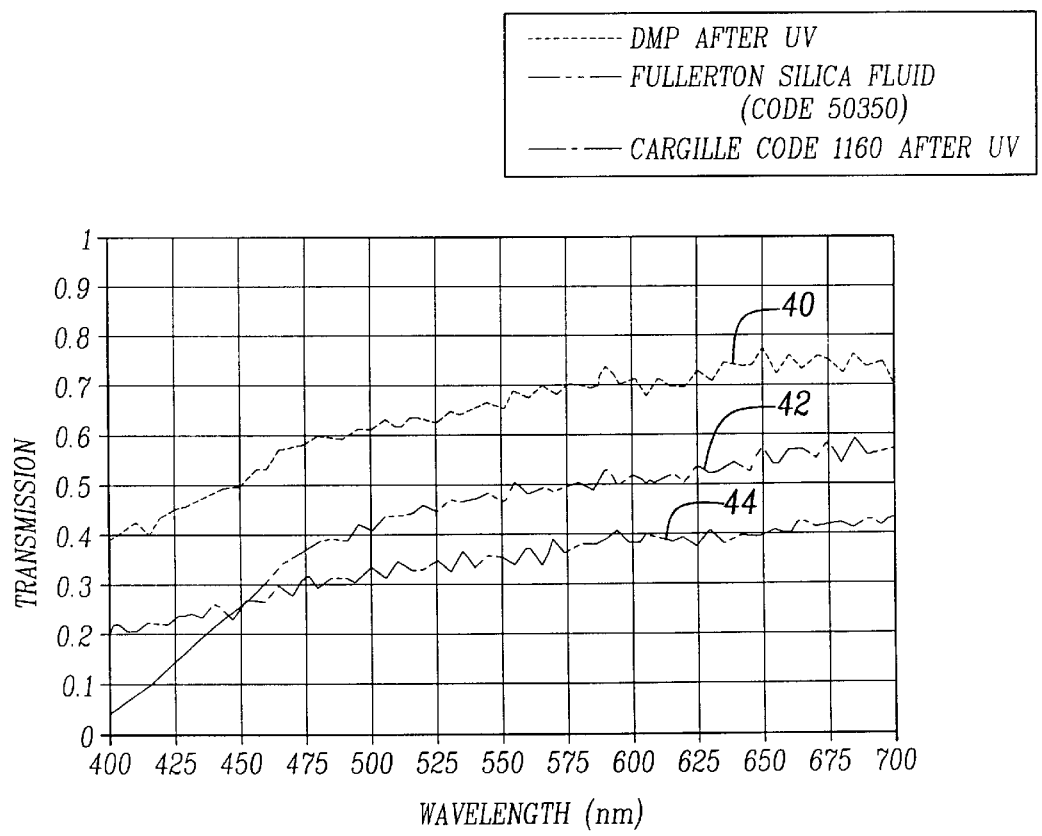
FIG. 2 is a graph of the transmission of various optical fluids versus wavelength throughout the visible spectrum.

Referring now to FIG. 2, there is shown a series of graphs comparing the spectral output of various optical fluids including the high viscosity Cargille Code 1160 and the low viscosity DMP. Data for generating this graph was taken from data measured for one centimeter of optical path extrapolated to 18 inches. In the upper graph labeled 40 the spectral output for DMP is shown. DMP is available from Aldrich Chemical Company of Milwaukee, Wis. In the middle graph, labeled 42, the spectral output for a silicon matching fluid is shown. This comprises Cargille Code 50350 fluid, available from R.P. Cargille Laboratories Incorporated of Cedar Grove, N.J.

The bottom graph, labeled 44 is the spectral output for Cargille Code 1160. The data shown is that of tests conducted after UV exposure. It is notable that the spectral output of DMP is significantly higher than 1160 throughout the visible spectrum. At the blue end of the spectrum, the transmission of DMP is nearly double that of 1160. At 700 nanometers the transmission of DMP is more than 50 percent higher than 1160.

These results translate into a significantly brighter image in a liquid crystal light valve projection system 10 shown in FIG. 1. Moreover, because of the relatively low transmission of 1160 in the blue region, when it is used in a multi-channel system, the red and green channels must be turned down somewhat to compensate for the low blue transmission to achieve the desired color temperature. In contrast, with the use of DMP now the red and green channels do not need to be turned down to this extent to yield the desired color temperature. Therefore, the resulting image is brighter because the red and green channels can be at a higher intensity level. Thus, increased brightness in the image of the liquid crystal light valve projection 10 in a three channel system is achieved for two reasons: 1) the higher transmission of the light throughout the optical spectrum as compared to Cargille Code 1160 and 2) with the higher resulting color temperature (due to higher transmission in the blue region) the red and green channels do not need to be turned down, thereby further increasing the overall brightness level. Thus, not only does DMP offer the advantages of low viscosity, but it has a higher transmission as well.

Figures 3, 4:
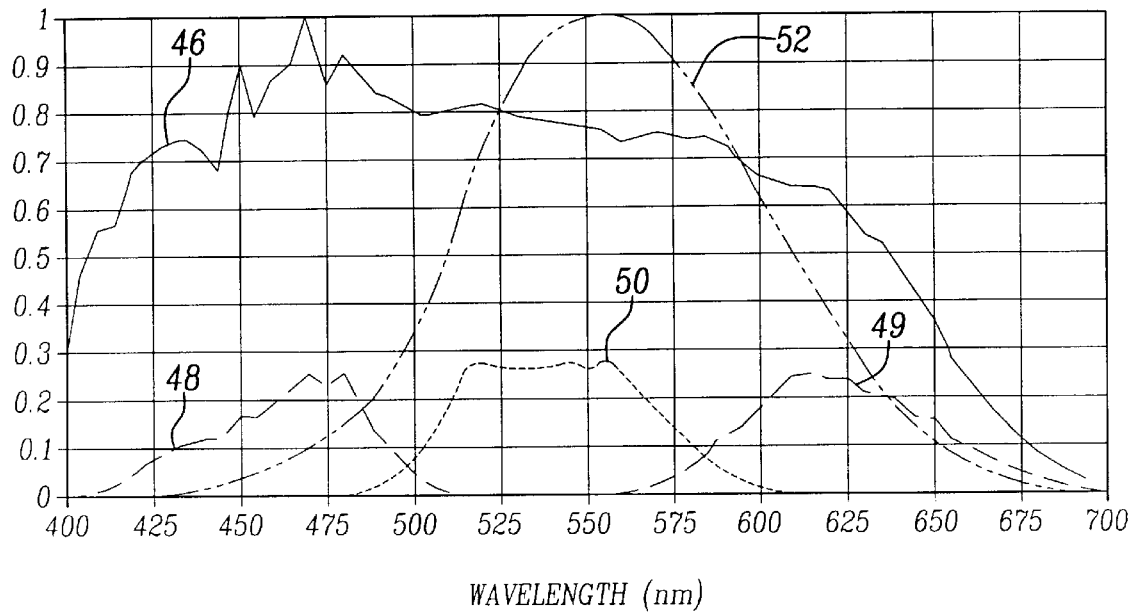
FIG. 3 is a graph of the spectral output of the Cargille Code 1160 prior art optical fluid verses wavelength throughout the optical spectrum for various spectral regions.
FIG. 4 is a table summarizing the data on which the FIG. 3 graph is based.

Referring now to FIG. 3, there is shown a series of graphs of the spectral output utilizing the Cargille 1160 optical fluid for three color channels. Curve 48 shows the transmission of blue light, curve 50 shows the transmission of green light, and curve 49 shows the transmission of red light. Curve 52 shows the (normalized) photooptical sensitivity curve which is assumed to be the ideal light source at the input of the prism. Curve 46 shows the expected spectral output obtained by combining the input and the transmission. As can be seen from the table in FIG. 4, the percentage of total transmission in the red region is 25.43 percent, in the green region 69.28 percent, and in the blue region 5.29 percent.

Figures 5, 6:
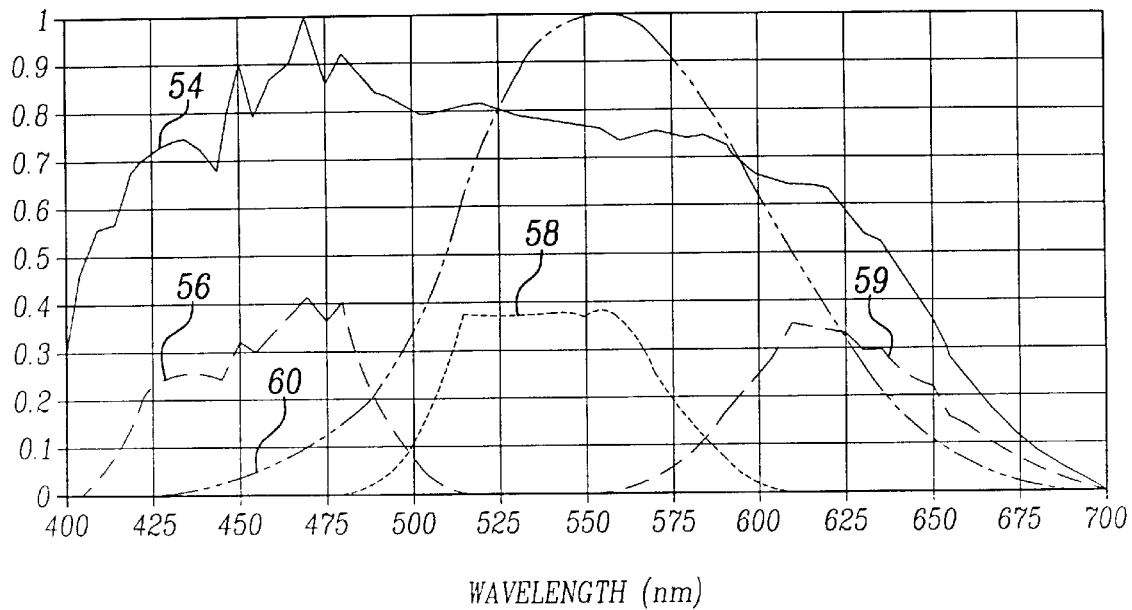
FIG. 5 is a graph of a spectral output of the DMP optical fluid verses wavelength throughout the optical spectrum shown for various optical regions.
FIG. 6 is a table summarizing the data upon which the graphs in FIG. 5 are based.

In contrast, referring now to FIG. 5, similar sets of curves are shown for a MacNeille prism using utilizing DMP for the optical fluid. Curve 56 shows the transmission of blue light, Curve 58 shows the transmission of green light, and Curve 59 shows transmission of red light. Curve 40 shows the expected spectral output obtained by combining the input and the transmission. The data is for a modeled prism with an 18 inch path length for a prism filled with Cargille Code 1160 with an index of 1.515. Curve 60 is the same as curve 52 in FIG. 3.

Referring now to FIG. 6, it can be seen that the red region of the spectrum accounts for 24.99% of the total transmission; the green channel, 68.9%; and the blue channel, 6.04%. This illustrates how the transmission utilizing DMP results in more transmission in the blue region as a percentage of the total light transmitted. This improvement in the color temperature makes possible the advantage discussed above. That is, reducing the necessity of turning down red and green channels to obtain the desired color temperature.

As a result, the present invention provides an optical system which utilizes a low viscosity optical fluid to reduce the temperature-induced striations in the prism 18 and therefore fluctuations in the image that limit resolution and cause oscillations irregularly across the image. In addition, the preferred fluid DMP has improved transmission overall. Moreover, in a multi-channel color projection system, the system provides the possibility of additional brightness due to the improved transmission in the blue region. Also, DMP recovers well from freezing and is lower in cost than previous optical fluids.

Another important aspect of DMP is that it is not a mixture and that its free of contaminants. Its purity is easily measured and it is available in consistently pure form which varies from batch to batch in manufacturing lots. It is thought that purity is an important factor in the successful use of DMP as an optical fluid. For this reason, filtering may be employed to insure there are no contaminants. For example, it has been found to be advantageous to filter DMP to at least 1.0 micron and ideally to 0.6 microns. It is thought that the DMP should be at least 98.5% pure to obtain satisfactory results. It is also important to maintain purity (for example, by preventing contamination from containers) to ensure the elimination of immiscible contaminating substances.

It should also be noted that other transmissive, homogenous, low-viscosity fluids with indices matching a desired glass may also yield similar advantages as DMP. In general, the fluid should be transparent, have an index of refraction matching the desired optical components, and have a viscosity no greater than 40 centistokes to achieve the advantages of the present invention. For example, fluids meeting this criteria which have low molecular weight hydrocarbon as a major component may be utilized. One example would be methyl benzoate. Also, fluid of the ester phthalate family may be used. Diethyl phthalate (DEP), DMP or a combination of the two would be expected to be nearly as satisfactory as DMP alone.

It should also be noted that the advantages of the present invention can be obtained in other embodiments besides color projection systems and in other systems besides MacNeille prisms. In general, the present invention will find advantageous uses in any application where it is desired to provide an optical fluid with close index matching to BK-7 glass or a fluid having an index matching other materials with other indices of refraction. Those skilled in the art can appreciate that other advantages can be obtained from the use of this invention and that modification may be made without departing from the true spirit of invention after studying the specification, drawings, and following claims.

What is claimed is:

1. An optical system comprising:

transparent fluid;

container filled with said fluid having at least one window for permitting subject light to enter therein;

at least one optical element within said container for performing a predetermined optical function on said subject light, wherein said fluid has a viscosity of between about 9 and 40 centistokes and said optical element has an index of refraction approximately the same as the transparent fluid, the transparent fluid providing increased transmission of blue light as a percentage of total light being transmitted.

2. The optical system of claim 1 wherein said transparent fluid has a low molecular weight hydrocarbon as a major component.

3. The optical system of claim 2 wherein said transparent fluid is in the ester phthalate family.

4. The optical system of claim 3 wherein said fluid is dimethyl phthalate.

5. The optical system of claim 1 wherein said optical fluid is 98.5% pure.

6. The optical system of claim 1 wherein said optical element is composed of a prism plate having an index of refraction of about 1.518 at about 554.5 nanometers.

7. The optical system of claim 1 further comprising a second window permitting subject light to exit the container therefrom.

8. The optical system of claim 7 further comprising a third window permitting subject light to exit and enter therefrom.

9. The optical system of claim 1 wherein said path length of said subject light within said container is at least two centimeters.

10. The optical system of claim 1 wherein said optical element is a polarizing beamsplitter.

11. The optical system of claim 5 further comprising a third window permitting subject light to exit and enter therefrom.

12. A method of producing an optical system, said method comprising:

mounting at least one optical element in a fluid tight container, wherein the optical element has a predetermined index of refraction;

filling the fluid tight container with a low molecular weight homogeneous fluid that increases transmission of blue light as a percentage of total light being transmitted, having a viscosity of between about 9 and 40 centistokes and having an index of refraction approximately the same as the optical element; and sealing the container.

13. The method of claim 12 further comprising the step of:

prior to filling said container, filtering said optical fluid to remove impurities with a filter capable of removing particles as small as one micron.

14. The method of claim 12 wherein said optical fluid is dimethyl phthalate.

15. A liquid crystal light valve (LCLV) projection system comprising:

light source;

cathode ray tube;

LCLV receiving light from said light source and said CRT;

projector lens receiving light from said LCLV;

prism element disposed in the optical path between said light source and said LCLV and also between the light path between said projection lens and said LCLV, wherein the prism element includes an optical element having a predetermined index of refraction; and enclosure containing said prism element, said enclosure also containing a transparent fluid having a viscosity of between about 9 and 40 centistokes and having an index of refraction approximately the same as the optical element and providing increased transmission of light in the optical spectrum, wherein said optical element is immersed in said fluid.

16. The optical system of claim 15 wherein said optical fluid is 98.5% pure.

17. The optical system of claim 15 wherein said optical element is composed of a prism plate having an index of refraction of about 1.518 at about 554.5 nanometers.

18. The optical system of claim 15 further comprising a second window permitting subject light to exit the container therefrom.

19. The optical system of claim 12 wherein said fluid is dimethyl phthalate.

20. An optical system comprising:

a transparent dimethyl phthalate fluid;

a container filled with said fluid having at least one window for permitting subject light to enter therein;

at least one optical element within said container for performing a predetermined optical function on said subject light, wherein said fluid has a viscosity of between about 9 and 40 centistokes and said optical element has an index of refraction approximately the same as the transparent fluid.

21. An optical system comprising:

a transparent fluid that is 98.5% pure;

a container filled with said fluid having at least one window for permitting subject light to enter therein;

at least one optical element within said container for performing a predetermined optical function on said subject light, wherein said fluid has a viscosity of between about 9 and 40 centistokes and said optical element has an index of refraction approximately the same as the transparent fluid.

22. A method of producing an optical system, said method comprising:

mounting at least one optical element in a fluid tight container, wherein the optical element has a predetermined index of refraction;

filtering said optical fluid to remove impurities with a filter capable of removing particles as small as one micron;

filling the fluid tight container with a homogeneous fluid having a viscosity of between about 9 and 40 centistokes and having an index of refraction approximately the same as the optical element; and sealing the container.

23. A method of producing an optical system, said method comprising:

mounting at least one optical element in a fluid tight container, wherein the optical element has a predetermined index of refraction;

filling the fluid tight container with a homogeneous dimethyl phthalate fluid having a viscosity of between about 9 and 40 centistokes and having an index of refraction approximately the same as the optical element; and sealing the container.

24. A liquid crystal light valve (LCLV) projection system comprising:

a light source;

a cathode ray tube;

an LCLV receiving light from said light source and said CRT;

a projector lens receiving light from said LCLV;

a prism element disposed in the optical path between said light source and said LCLV and also between the light path between said projection lens and said LCLV, wherein the prism element includes an optical element having a predetermined index of refraction; and an enclosure containing said prism element, said enclosure also containing a fluid selected from the group consisting of dimethyl phthalate and diethyl phthalate, said fluid having a viscosity of between about 9 and 40 centistokes and having an index of refraction approximately the same as the optical element, wherein said optical element is immersed in said fluid.

25. A liquid crystal light valve (LCLV) projection system comprising:

a light source;

a cathode ray tube;

an LCLV receiving light from said light source and said CRT;

a projector lens receiving light from said LCLV;

a prism element disposed in the optical path between said light source and said LCLV and also between the light path between said projection lens and said LCLV, wherein the prism element includes an optical element having a predetermined index of refraction; and an enclosure containing said prism element, said enclosure also containing a transparent fluid having a viscosity of between about 9 and 40 centistokes and having an index of refraction approximately the same as the optical element, wherein said optical element is immersed in said fluid, said transparent fluid being 98.5% pure.

* * * * *